United States Patent
Tsuchiya et al.

[11] Patent Number: 6,083,329
[45] Date of Patent: Jul. 4, 2000

[54] GAS SHIELDING APPARATUS AND GAS SHIELDING METHOD

[75] Inventors: Masaki Tsuchiya, Yokkaichi; Hiroaki Suzuki, Nagoya, both of Japan

[73] Assignee: Daido Tokushuko Kabushiki Kaisha, Nagoya, Japan

[21] Appl. No.: 09/035,107

[22] Filed: Mar. 5, 1998

[30] Foreign Application Priority Data

| Mar. 7, 1997 | [JP] | Japan | 9-070632 |
| May 22, 1997 | [JP] | Japan | 9-150028 |
| Jan. 27, 1998 | [JP] | Japan | 10-030623 |

[51] Int. Cl.$^7$ .............. B23K 13/01; H05B 6/26; C21D 1/10
[52] U.S. Cl. ............ 148/526; 148/567; 219/617; 219/651
[58] Field of Search ................. 148/520, 526, 148/567; 219/617, 651

[56] References Cited

FOREIGN PATENT DOCUMENTS

| 0 803 313 | 10/1997 | European Pat. Off. . |
| 2 670 147 | 6/1992 | France . |
| 1 254 889 | 11/1971 | United Kingdom . |
| 1537236 | 12/1978 | United Kingdom . |

*Primary Examiner*—Deborah Yee
*Attorney, Agent, or Firm*—Nikaido, Marmelstein, Murray & Oram LLP

[57] ABSTRACT

A gas shielding apparatus comprising a main gas jacket having induction heating means, and front gas jacket and rear gas jacket integrally disposed at supply side and discharge side of a member to be bonded or a member to be heated of the main gas jacket, wherein gas shielding is achieved by setting the internal pressure of the main gas jacket lower than the internal pressure of the front gas jacket and rear gas jacket, so that the holding time of the shielding gas jacket in the main gas jacket becomes long.

10 Claims, 7 Drawing Sheets

← : SHIELD GAS DIRECTION

FIG. 8

PRIOR ART

GAS SHIELDING APPARATUS AND GAS SHIELDING METHOD

BACKGROUND OF THE INVENTION

The present invention relates to a gas shielding apparatus and a gas shielding method. More particularly, it relates to improvement of gas shielding in bonding portion or heating area in a diffusion bonding or high frequency hardening.

Figure 8:
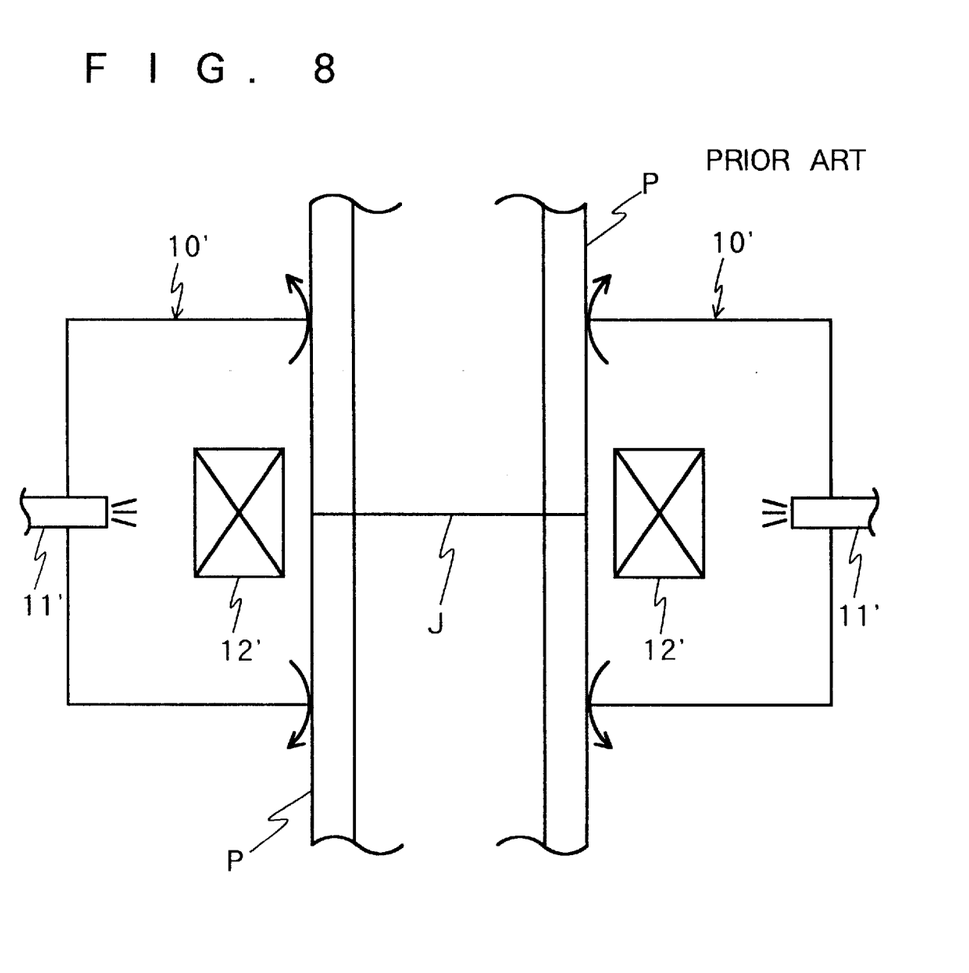
FIG. 8 is a schematic diagram of a conventional gas shielding apparatus.

Hitherto, in order to prevent oxidation of a bonding surface in diffusion bonding, as shown in FIG. 8, diffusion bonding is conducted by covering the bonding and heating area with a gas jacket 10'. Besides, since there is a gap between this gas jacket 10' and members to be bonded P, P penetrating through the gas jacket 10', in order to prevent invasion of air into the gas jacket 10', inert gas (hereinafter called shielding gas) is supplied into the gas jacket 10' from a nozzle 11', and diffusion bonding is carried out while shielding the heating zone. That is, the shielding gas leaks out from the gap between the member to be bonded (member to be heated) P, P of the gas jacket 10', and diffusion bonding is performed while preventing invasion of air into the gas jacket 10' from outside. In FIG. 8, reference numeral 12' shows an induction heating coil.

However, when diffusion bonding is done while leaking out the shielding gas as shown in FIG. 8, a gas flow is formed in the gas jacket 10', and the outside of the bonded joint J is cooled by this gas flow. As a result, the bonded joint J is not sufficiently heated, which may lead to decline of quality of the bonded interface or decline of bonding strength.

Such problems similarly occur in high frequency hardening in which gas shielding is effected by using a gas jacket.

The invention is devised in the light of the problems of the prior art, and it is hence an object thereof to present a gas shielding apparatus and a gas shielding method not causing decline of quality of the bonding portion or heating area and decline of strength.

SUMMARY OF THE INVENTION

A gas shielding apparatus of the invention comprises a main gas jacket having induction heating means, and front gas jacket and rear gas jacket integrally disposed at supply side and discharge side of a member to be bonded or a member to be heated of the main gas jacket.

In the gas shielding apparatus of the invention, the front gas jacket and or rear gas jacket is composed of plural blocks in which shielding gas is supplied.

In the gas shielding apparatus of the invention, the main gas jacket, front gas jacket and rear gas jacket are individually divided into two sections, and each section is free to move back and forth toward the member to be bonded or the member to be heated.

In the gas shielding apparatus of the invention, each shielding gas injection nozzle of the main gas jacket is inclined at a specific angle to the radial direction so that the shielding gas injected therefrom may form a swirl flow around the outer circumference of the member to be bonded or the member to be heated.

A gas shielding method of the invention is a gas shielding method using a gas shielding apparatus comprising a main gas jacket having induction heating means, and front gas jacket and rear gas jacket integrally disposed at supply side and discharge side of a member to be bonded or a member to be heated of the main gas jacket, in which gas shielding is achieved by setting the internal pressure of the main gas jacket lower than the internal pressure of the front gas jacket and rear gas jacket.

In the gas shielding method of the invention, the front gas jacket and or rear gas jacket is composed of plural blocks in which shielding gas is supplied, and the internal pressure of the block close to the main gas jacket out of these blocks is set lower than the internal pressure of its outside block.

In the gas shielding method of the invention, the shielding gas is injected from the main gas jacket so as to form a swirl flow around the outer circumference of the member to be bonded or the member to be heated.

In the gas shielding apparatus and gas shielding method of the invention, shielding gas is supplied to each one of the main gas jacket, front gas jacket and rear gas jacket. The shielding gas supplied into each gas jacket leaks out through the gap between the gas jackets and the member to be bonded (member to be heated), but until the shielding gas supplied into the main gas jacket leaks out, it passes through the gap between the front gas jacket or rear gas jacket and the member to be bonded (member to be heated). Accordingly, its speed is much lower than the speed in the conventional gas jacket. That is, the time of the shielding gas supplied in the main gas jacket staying within the main gas jacket is long. Therefore, as the holding time of the shielding gas in the main gas jacket is long, the shielding gas is heated by the heat generated at the time of diffusion bonding and is raised in temperature. Therefore, if the shielding gas in the main gas jacket leaks out, the surrounding area of the bonding portion and member to be heated is not cooled by it, thereby avoiding decline of quality of the bonding interface or heating area or decline of bonding strength.

In other words, the quality of the bonding interface and heating area is enhanced, and the strength is increased.

DETAILED DESCRIPTION OF THE INVENTION

Referring now to the accompanying drawings, embodiments of the invention are described below, but it must be noted that the invention is not limited to the illustrated embodiments alone.

Embodiment 1

Figure 1:
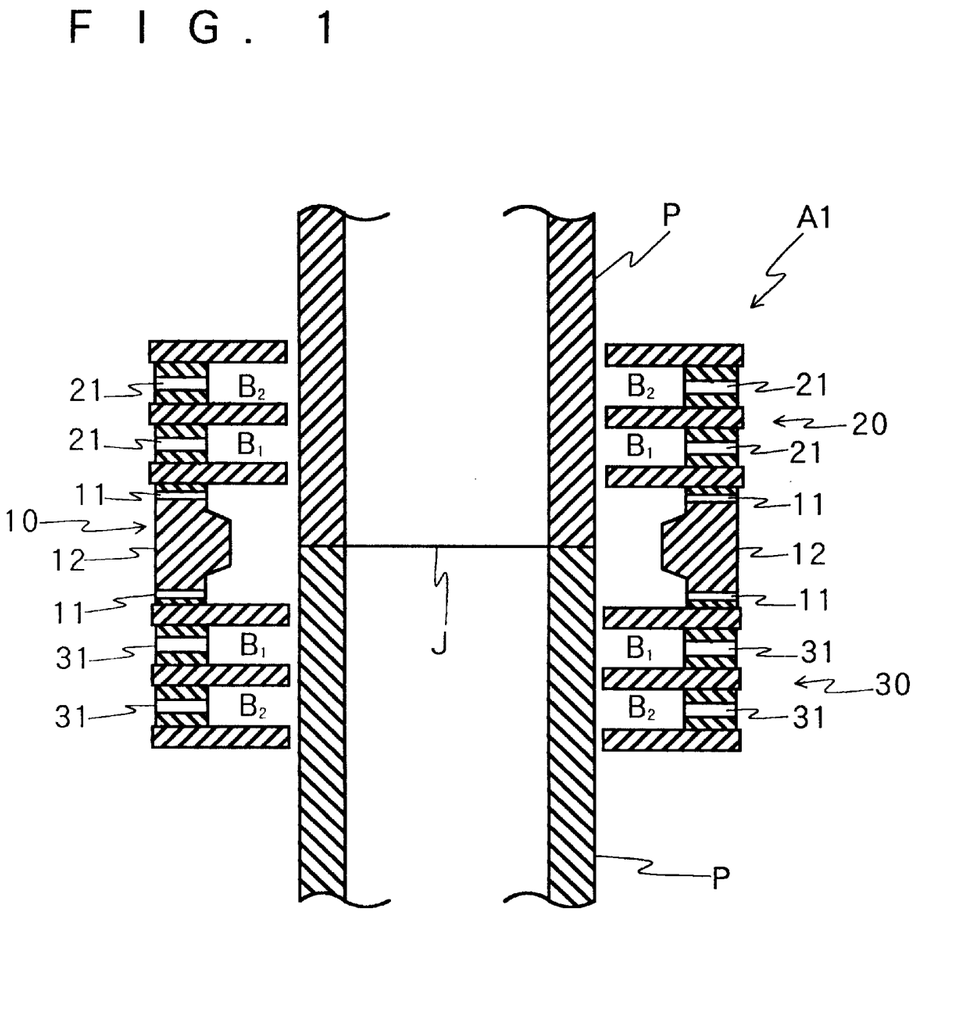
FIG. 1 is an essential longitudinal sectional view of a shielding apparatus in embodiment 1 of the invention.

A gas shielding apparatus A1 in embodiment 1 of the invention is shown in a sectional view in FIG. 1, and this gas shielding apparatus A1 is applied in diffusion bonding for supplying the member to be bonded P in the vertical direction, which comprises a main gas jacket 10 having a shielding gas feed port 11 and a high frequency heating coil 12 as induction heating means, and an upper gas jacket (front gas jacket) 20 having a shielding gas feed port 21 and a lower gas jacket (rear gas jacket) 30 having a shielding gas feed port 31 disposed integrally with the main gas jacket 10 in the upper part (front part) and lower part (rear part) of this main gas jacket 10. Herein, the shielding gas feed port 11 is disposed oppositely, for example, at the main gas jacket 10, and the shielding gas feed ports 21, 31 are also similarly disposed oppositely at the front gas jacket 20 and rear gas jacket 30.

The upper gas jacket 20 and lower gas jacket 30 are composed in plural blocks B each having the shielding gas feed ports 21, 31 as shown in FIG. 1. The block B, in the example shown in FIG. 1, is composed of upper and lower blocks B1, B2, that is, first block B1 at the main jacket side and second block B2 at its outside, but the number of blocks may be three or more. The gap of the main gas jacket 10, upper gas jacket 20 and lower gas jacket 30 against the member to be bonded P is same as in the prior art.

By using thus constituted gas shielding apparatus A1, gas shielding of bonded joint J by diffusion bonding is achieved by supplying shielding gas into the main gas jacket 10, upper gas jacket 20 and lower gas jacket 30 through shielding gas feed ports 11, 21, 31. In this case, the shielding gas supplied into the gas jackets 10, 20, 30 leaks outside through the gap between the gas jackets 10, 20, 30 and the member to be bonded P, but the shielding gas supplied into the main gas jacket 10 must pass through the gap between the upper gas jacket 20 or lower gas jacket 30 and the member to be bonded P, and since the upper gas jacket 20 and lower gas jacket 30 are individually composed of plural blocks B1, B2, the speed is extremely slow as compared with the speed in the conventional gas jacket. That is, the retention time of the shielding gas supplied in the main gas jacket 10 staying in the main gas jacket 10 is longer. As the holding time of the shielding gas in the main gas jacket 10 is longer, the shielding gas is heated by the heat generated at the time of diffusion bonding and is raised in temperature. Therefore, if the shielding gas of the main gas jacket 10 leaks outside, it does not lead to problems, such as cooling of the surrounding of the bonded joint J, lowering of quality of bonded joint J, or lowering of bonding strength. In other words, the quality of the bonded joint J is enhanced, and the bonding strength is increased.

In this case, by setting the internal pressure of the main gas jacket 10 slightly lower than the internal pressure of the upper gas jacket 20 and lower gas jacket 30, outward leak of the shielding gas from the main gas jacket 10 is further suppressed, and the quality of the bonded joint J is further enhanced and the bonding strength is further increased. In the upper gas jacket 20 and lower gas jacket 30, more preferably, the internal pressure of the first block B1 should be set slightly lower than the internal pressure of the second block B2, individually.

Embodiment 2

Figure 2:
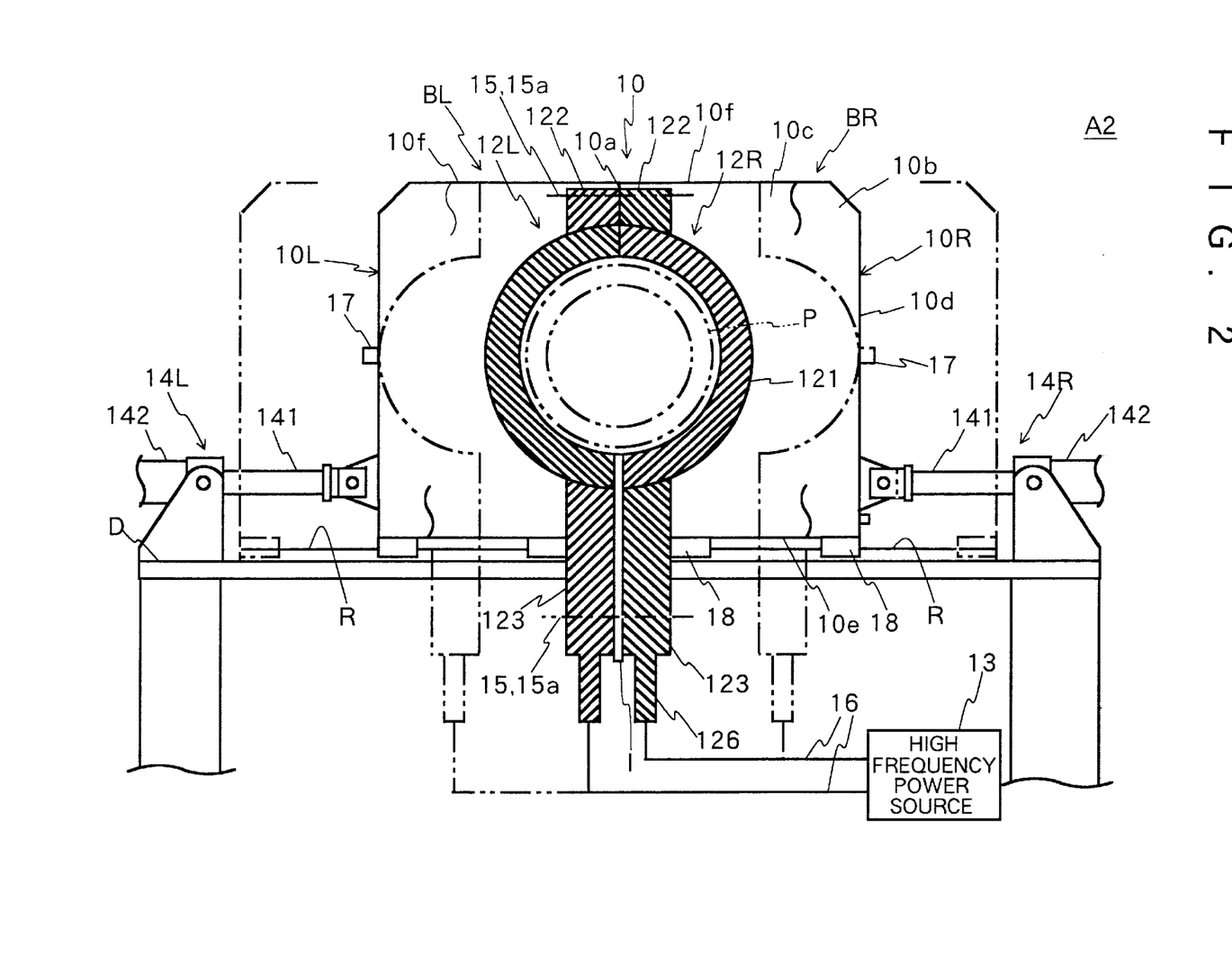
FIG. 2 is a front view showing essential parts of a shielding apparatus in embodiment 2 of the invention in a sectional view.
Figure 3:
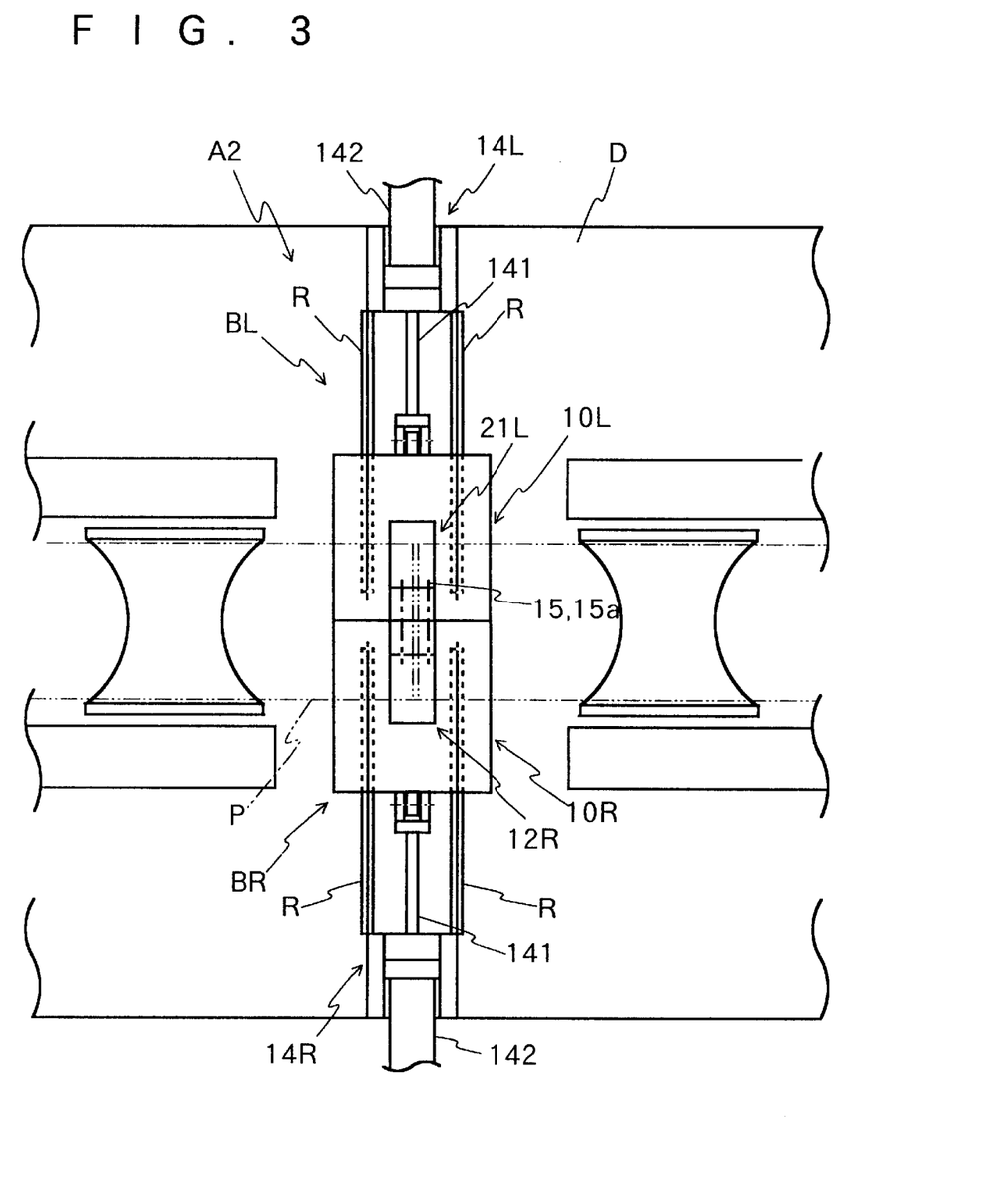
FIG. 3 is a plan view; of the embodiment illustrated in FIG. 2

A gas shielding apparatus A2 in embodiment 2 of the invention is shown in FIG. 2 and FIG. 3, and this gas shielding apparatus A2 is modified from the gas shielding apparatus A1 in embodiment 1, that is, it is composed of right block BR and left block BL so as to be divided in the lateral direction, and they are disposed on a bed D. From the viewpoint of simplification of drawing, only the main gas jacket 10 is shown, and the front and rear gas jackets are omitted.

More specifically, the right block BR comprises a right heating coil divided element 12R, a right gas jacket 10R covering this right heating coil divided element 12R from outward, and right driving element 14R for moving the right heating coil divided element 12R and right gas jacket 10R in the horizontal direction (the forward and backward direction to the member to be bonded (member to be heated) P), and the left block BL comprises a left heating coil divided element 12L, a left gas jacket 10L covering this left heating coil divided element 12L from outward, and left driving element 14L for moving the left heating coil divided element 12L and left gas jacket 10L in the horizontal direction (the forward and backward direction to the member to be bonded (member to be heated) P).

Figure 4:
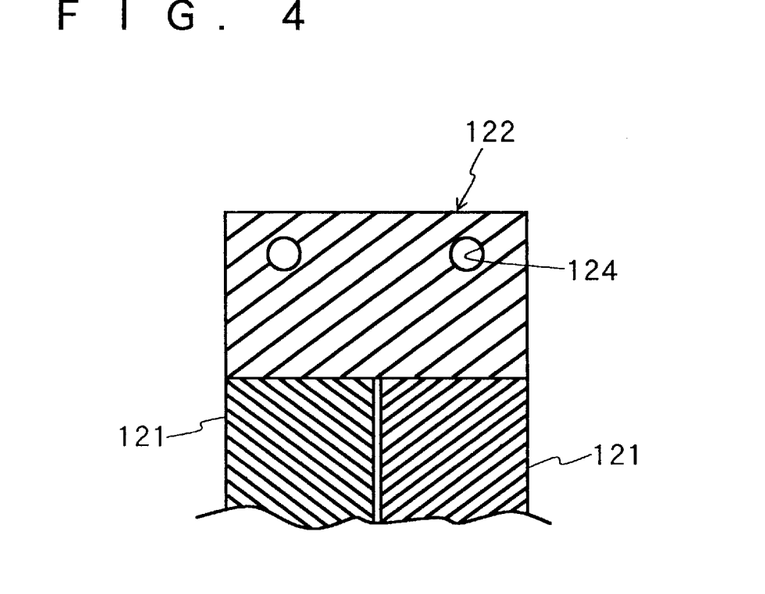
FIG. 4 is a longitudinal sectional view of an upper connecting member of the same shielding apparatus.
Figure 5:
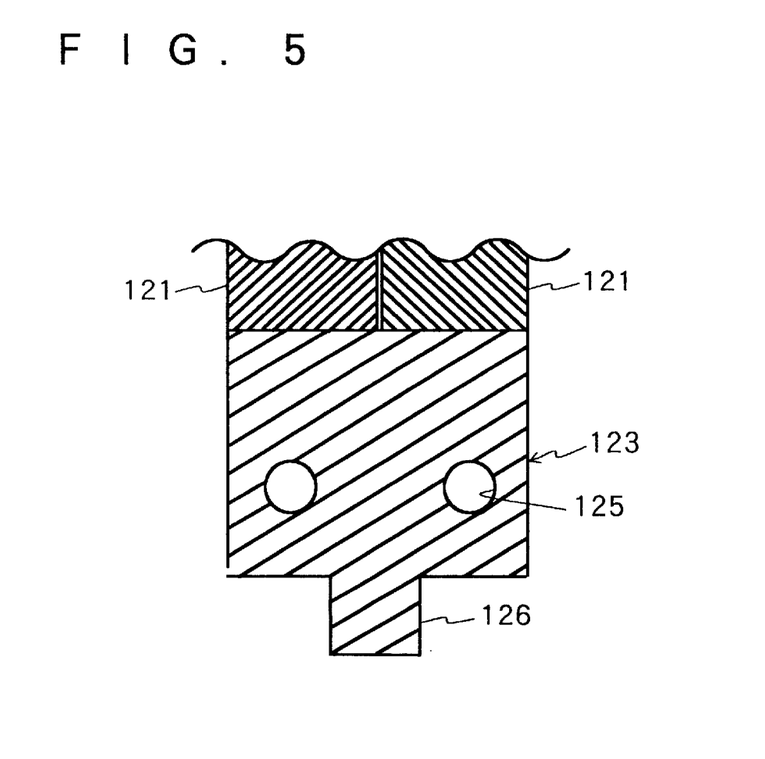
FIG. 5 is a longitudinal sectional view of a lower connecting member of the same shielding apparatus.

The right heating coil divided element 12R is composed of a semiarch coil main body 121, and connecting members integrally formed at both ends of the coil main body 121, that is, upper connecting member 122 and lower connecting member 123. The upper connecting member 122 is a block element forming a penetration hole 124 (as shown in FIG. 4) for inserting a clamp bolt 15 in the upper part, and it is integrally formed to the upper end of the coil main body 121. On the other hand, the lower connecting member 123 is a block element forming a penetration hole 125 for inserting the clamp bolt 15 in the middle, and forming a connection part 126 with the high frequency power source 13 at the lower end, and it is integrally formed to the lower end of the coil main body 121. At the connection part 126 of the lower connecting member 123, a power cable 16 is connected with flexibility.

The right gas jacket 10R is a box, of which left side 10a is opened toward the right heating coil divided element 12R, and front side 10b left end and rear side 10c left end have an arch notch corresponding to the member to be bonded P to be heated, and a gas nozzle 17 for supplying shielding gas is provided at the right side 10d, a notch for penetration (not clearly shown in drawing) of the lower bonding member 123 is provided in the bottom, and sliding members 18, 18 for sliding guide rails R, R disposed in the bed D described later are disposed at the back side 10e at proper intervals. Thus constituted right gas jacket 10R is set to the right heating coil divided element 12R by proper means. The ceiling 10f of the right gas jacket 10R is, although not clearly shown, free to open and close so as to be capable of clamping by inserting the bolt 15 into the penetration hole 124 provided in the upper connecting member 122. Connection between the gas nozzle 17 and shielding gas supplying member (not shown) is achieved through a flexible tube although not shown in the drawing.

The right driving means 14R specifically comprises a hydraulic cylinder 142 having the end of its piston rod 141 connected at the right side 10d of the right gas jacket 10R, and a pair of guide rails R, R for moving the right gas jacket 10R, and the hydraulic cylinder 142 and guide rails R, R are disposed on the bed D toward the member to be bonded P to be heated. Since the right driving means 14R is thus constituted, when the piston rod 141 draws back, the sliding member 18 slides on the guide rail R, and the right gas jacket 10R moves backward of the member to be bonded P.

The left heating coil divided element 12L, left gas jacket 10L, and left driving means 14L are composed same as the right heating coil divided element 12R, right gas jacket 10R, and right driving means 14R, respectively, except that the constitution is a mirror image.

Heating of the member to be bonded P by thus constituted gas shielding apparatus A2 is described below.

(1) The piston rods 141 of the hydraulic cylinders 142 of the right driving means 14R and left driving means 14L are moved back, and the right heating coil divided element 12R and left heating coil divided element 12L are moved back to be in a waiting state (see twin dot chain line in FIG. 2).

(2) The member to be bonded P to be heated is set at specified position from above.

(3) The piston rods 141 of the hydraulic cylinders 142 of the right driving means 14R and left driving means 14L are moved forward, and the right heating coil divided element 12R and left heating coil divided element 12L are moved forward to contact the right heating coil divided element 12R and left heating coil divided element 12L.

(4) By opening the ceilings 10f of the right gas jacket 10R and left gas jacket 10L, bolts 15 are inserted into penetration holes 124 of upper connecting members 122, 122 of the right heating coil divided element 12R and left heating coil divided element 12L, and nuts 15a are fitted to the bolts 15, so that the upper connecting members 122, 122 are mutually clamped.

(5) After interposing an insulation board I between the lower connecting members 123, 123 of the right heating coil divided element 12R and left heating coil divided element 12L, bolts (made of insulating material) 15 are inserted into penetration holes 125, and nuts 15a are fitted to the bolts 15, so that the lower connecting members 123, 123 are mutually clamped. As a result, the right heating coil divided element 12R and left heating coil divided element 12L are integrated to form a heating coil.

(6) Shielding gas (argon gas) is supplied from the gas nozzle 17, and the inside of the right and left gas jackets 10R, 10L is shielded.

(7) High frequency current (3 kHz to 100 kHz) is supplied into the heating coil from the high frequency power source 13, and the member to be bonded P is heated by induction.

(8) When heating is over, power feed to the heating coil is stopped.

(9) Clamping of right heating coil divided element 12R and left heating coil divided element 12L by bolts 15 and nuts 15a is removed.

(10) The piston rods 141 of hydraulic cylinders 142 of the right driving means 14R and left driving means 14L are moved back, and the right heating coil divided element 14R and left heating coil divided element 12L are moved back to be in waiting state.

(11) After processing the element to be bonded P as specified, it is removed upward.

Thus, in embodiment 2, since the heating coil is composed of right heating coil divided element 12R and left heating coil divided element 12L, and the divided elements 12R, 12L are free to open and close laterally, it is extremely quick to mount a long member to be bonded (member to be heated) P such as pipe onto the heating coil or to take out from the heating coil. As a result, the working efficiency of induction heating of the long member to be bonded (member to be heated) P such as pipe is extremely enhanced.

Embodiment 3

Figure 6:
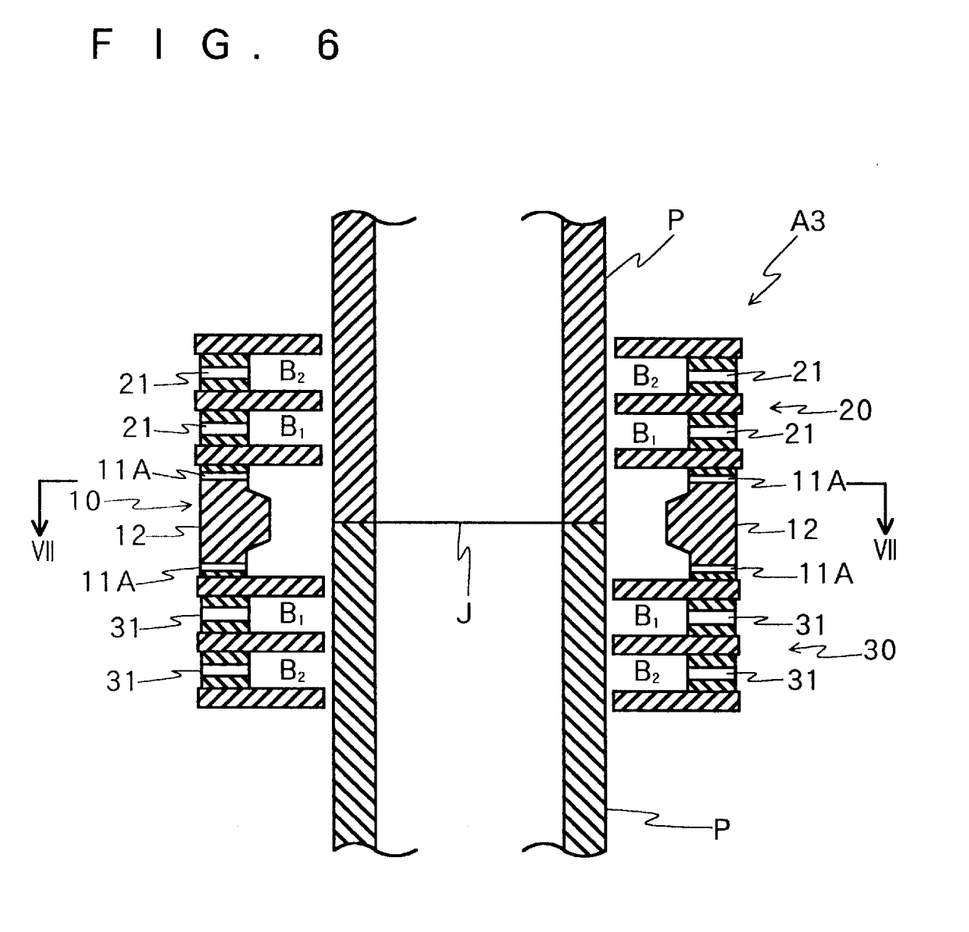
FIG. 6 is an essential longitudinal sectional view of a gas shielding apparatus in embodiment 3 of the invention.
Figure 7:
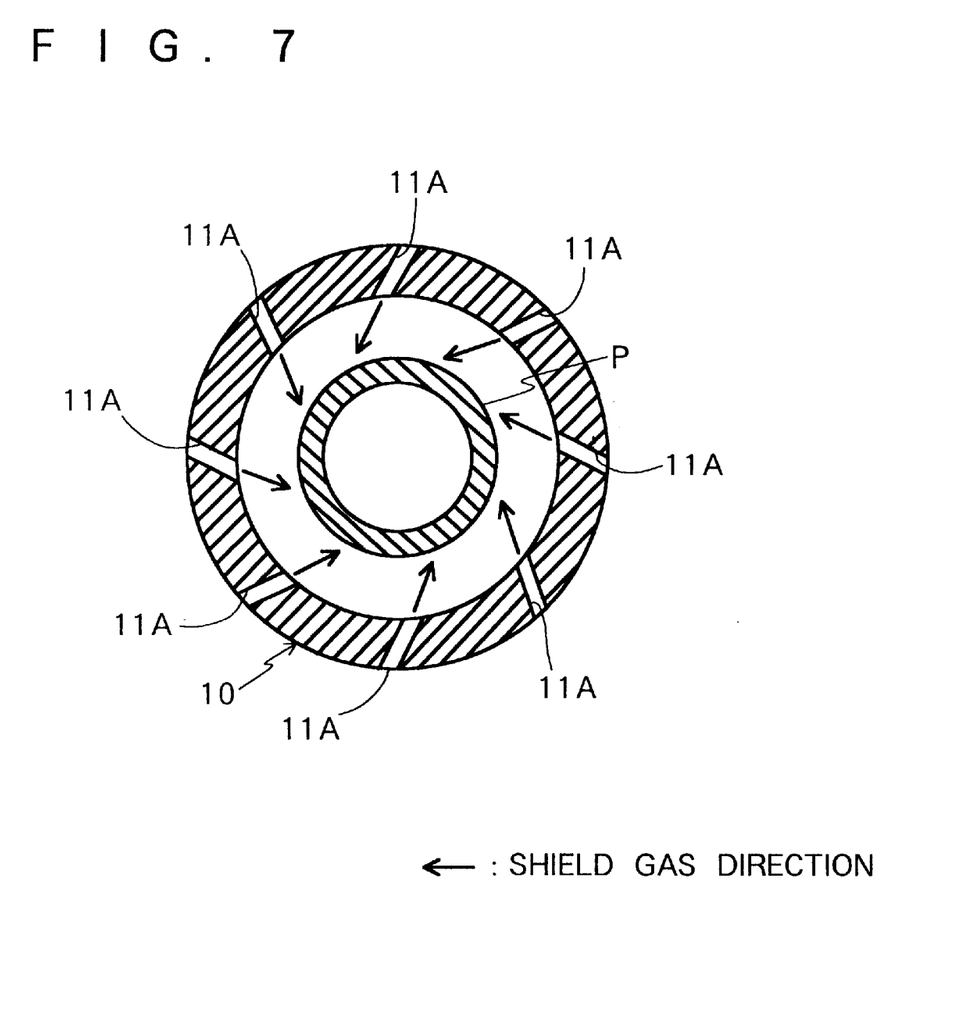
FIG. 7 is a sectional view along line VII—VII in FIG. 6.

A gas shielding apparatus A3 in embodiment 3 of the invention is shown in FIG. 6 and FIG. 7. This gas shielding apparatus A3 is modified from embodiment 1, and, as shown in FIG. 7, a shielding gas feed port (injection nozzle) 11A for injecting shielding gas provided in the main gas jacket 10 is inclined by a specified angle to the radial direction, and the injected shielding gas is circulated around the member to be bonded (member to be heated) P. The other constitution of embodiment 3 is same as in embodiment 1.

Thus, in embodiment 3, since the shielding gas injected from the main gas jacket 10 is turned around the member to be bonded (member to be heated) P, if the member to be bonded (member to be heated) P is supplied horizontally, the temperature of the shielding gas in the main gas jacket is uniform. Hence, uneven heating does not occur in the bonded joint J or heating area.

In embodiment 3, moreover, the shielding gas may be also injected from the front gas jacket 20 and rear gas jacket 30 so as to circulate around the member to be bonded (member to be heated) P.

The invention is herein described by referring to embodiments, but the invention is not limited to the illustrated embodiments alone. For example, gas shielding in diffusion bonding is explained in the embodiment, but it may be similarly applied in gas shielding by high frequency hardening.

As described specifically, herein, according to the invention, oxidation by heating in the bonding portion or heating area can be prevented, and cooling of the vicinity of the bonding portion or heating area by shielding gas is prevented, and therefore the quality of the bonding portion and heating area is enhanced and the strength is increased, so that excellent effects are obtained.

What is claimed is:

1. A gas shielding apparatus comprising a main gas jacket having induction heating means for heating a member to be heated or bonded, and a front gas jacket and a rear gas jacket integrally disposed at member entry and removal sides of said shielding apparatus of said main gas jacket.

2. The gas shielding apparatus of claim 1, wherein at least one of said front gas jacket and rear gas jacket is composed of plural blocks in which shielding gas is supplied.

3. The gas shielding apparatus of claim 1 or 2, wherein said main gas jacket, front gas jacket and rear gas jacket are individually divided into two sections, and each section is free to move back and forth toward the member to be heated or bonded.

4. The gas shielding apparatus of claim 1 or 2, wherein said main gas jacket is provided with at least one shielding gas injection nozzle, each shielding gas injection nozzle of said main gas jacket being inclined at a specific angle to the radial direction so that the shielding gas injected therefrom may form a swirl flow around the outer circumference of the member to be heated or bonded.

5. A gas shielding method used in bonding or heating an article using a gas shielding apparatus comprising a main gas jacket having induction heating means for heating a member to be heated or bonded, and a front gas jacket and a rear gas jacket integrally disposed at a member entry or removal sides of said shielding apparatus of said main gas jacket, said gas shielding method comprising setting the internal pressure of the main gas jacket lower than the internal pressure of the front gas jacket and rear gas jacket.

6. The gas shielding method of claim 5, wherein at least one of said front gas jacket and said rear gas jacket is composed of plural blocks in which shielding gas is supplied, including a block closest to the main gas jacket and a block most remote from the main gas jacket, and the internal pressure of the block closest to the main gas jacket is set lower than the internal pressure of the block most remote from the main gas jacket.

7. The gas shielding method of claim 5 or 6, wherein the shielding gas is injected into said main gas jacket so as to form a swirl flow around the outer circumference of the member to be bonded or the member to be heated.

8. The gas shielding apparatus of claim 2, wherein both said front and rear gas jackets are composed of plural blocks in which shielding gas is supplied.

9. The gas shielding method of claim 6, wherein both said front and rear gas jackets are composed of plural blocks in which shielding gas is supplied.

10. The gas shielding method of claim 5, wherein said article is concurrently heated while gas shielding is being conducted.

* * * * *